US009606412B2

(12) United States Patent
Geerlings et al.

(10) Patent No.: US 9,606,412 B2
(45) Date of Patent: Mar. 28, 2017

(54) WINDOW SYSTEM WITH INDICIA

(71) Applicant: Gentex Corporation, Zeeland, MI (US)

(72) Inventors: Kurtis L. Geerlings, Zeeland, MI (US); David J. Cammenga, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/065,329

(22) Filed: Mar. 9, 2016

(65) Prior Publication Data
US 2016/0266458 A1 Sep. 15, 2016

Related U.S. Application Data

(60) Provisional application No. 62/130,095, filed on Mar. 9, 2015.

(51) Int. Cl.
*G02F 1/153* (2006.01)
*G02F 1/157* (2006.01)
(Continued)

(52) U.S. Cl.
CPC .......... *G02F 1/157* (2013.01); *B23K 26/0006* (2013.01); *B23K 26/0057* (2013.01);
(Continued)

(58) Field of Classification Search
CPC .......... G02F 1/1523; G02F 1/15; G02F 1/163; G02F 1/0018; G02F 1/0063; G02F 1/03;
(Continued)

(56) References Cited

U.S. PATENT DOCUMENTS

| 5,042,923 | A | 8/1991 | Wolf et al. |
| 5,668,663 | A | 9/1997 | Varaprasad et al. |

(Continued)

FOREIGN PATENT DOCUMENTS

RU 2008288 C1 2/1994

OTHER PUBLICATIONS

International Search Report and Written Opinion of the International Searching Authority dated Jun. 20, 2016 (International Application No. PCT/US206021526) 7 pages.

*Primary Examiner* — Mahidere Sahle
(74) *Attorney, Agent, or Firm* — Price Heneveld LLP; Bradley D. Johnson

(57) ABSTRACT

A window system is provided that includes an electro-optic element having a first substantially transparent substrate defining first and second surfaces. The second surface has a first electrically conductive layer and a second substantially transparent substrate defines third and fourth surfaces. The third surface has a second electrically conductive layer and a primary seal disposed between the first and second substrates. The seal and the first and second substrates define a cavity therebetween. An electro-optic medium is disposed in the cavity that is variably transmissive such that the electro-optic element is operable between substantially clear and darkened states. A polymeric dust cover is positioned away from the electro-optic element defining at least two major surfaces and at least one indicia disposed in the dust cover. The indicia includes a plurality of damage channels having an aspect ratio greater than about 10:1.

20 Claims, 3 Drawing Sheets

(51) Int. Cl.

| | | |
|---|---|---|
| *G02F 1/161* | (2006.01) | |
| *G02B 27/00* | (2006.01) | |
| *G02F 1/1333* | (2006.01) | |
| *G02B 5/02* | (2006.01) | |
| *G02B 5/18* | (2006.01) | |
| *B23K 26/0622* | (2014.01) | |
| *B23K 26/53* | (2014.01) | |
| *B23K 26/00* | (2014.01) | |
| *B23K 26/08* | (2014.01) | |
| *B23K 103/00* | (2006.01) | |

(52) U.S. Cl.
CPC .......... *B23K 26/0622* (2015.10); *B23K 26/08* (2013.01); *B23K 26/53* (2015.10); *G02B 5/0263* (2013.01); *G02B 5/1842* (2013.01); *G02B 27/0006* (2013.01); *G02F 1/13338* (2013.01); *G02F 1/161* (2013.01); *B23K 2203/42* (2015.10)

(58) Field of Classification Search
CPC .......... G02F 1/0353; G02F 2001/1536; G02F 2001/1515; G02B 5/08; G02B 5/085; G02B 5/223; G02B 5/23; G02B 27/0006; G02B 7/182; G02B 1/10; G02B 1/105; G02C 7/101; G02C 7/102
USPC .................................................. 359/245–279
See application file for complete search history.

(56) References Cited

U.S. PATENT DOCUMENTS

| | | |
|---|---|---|
| 5,724,187 A | 3/1998 | Varaprasad et al. |
| 5,805,330 A | 9/1998 | Byker et al. |
| 5,928,572 A | 7/1999 | Tonar et al. |
| 5,940,201 A | 8/1999 | Ash et al. |
| 5,998,617 A | 12/1999 | Srinivasa et al. |
| 6,020,987 A | 2/2000 | Baumann et al. |
| 6,037,471 A | 3/2000 | Srinivasa et al. |
| 6,045,643 A | 4/2000 | Byker et al. |
| 6,137,620 A | 10/2000 | Guarr et al. |
| 6,141,137 A | 10/2000 | Byker et al. |
| 6,193,912 B1 | 2/2001 | Thieste et al. |
| 6,239,898 B1 | 5/2001 | Byker et al. |
| 6,241,916 B1 | 6/2001 | Claussen et al. |
| 6,249,369 B1 | 6/2001 | Theiste et al. |
| 6,407,847 B1 | 6/2002 | Poll et al. |
| 6,433,913 B1 | 8/2002 | Bauer et al. |
| 6,433,914 B1 | 8/2002 | Lomprey et al. |
| 6,519,072 B2 | 2/2003 | Nishikitani et al. |
| 6,567,708 B1 | 5/2003 | Bechtel et al. |
| 6,597,489 B1 | 7/2003 | Guarr et al. |
| 7,085,609 B2 | 8/2006 | Bechtel et al. |
| 7,256,923 B2 | 8/2007 | Liu et al. |
| 7,428,091 B2 | 9/2008 | Baumann et al. |
| 7,502,156 B2 | 3/2009 | Tonar et al. |
| 7,525,714 B2 | 4/2009 | Poll et al. |
| 7,535,614 B1 | 5/2009 | Tapley et al. |
| 7,822,490 B2 | 10/2010 | Bechtel et al. |
| 7,855,821 B2 | 12/2010 | Baumann et al. |
| 7,990,603 B2 | 8/2011 | Ash et al. |
| 8,169,684 B2 | 5/2012 | Bugno et al. |
| 2005/0150589 A1 | 7/2005 | Amos et al. |
| 2005/0200933 A1 | 9/2005 | Weidner |
| 2005/0270621 A1 | 12/2005 | Bauer et al. |
| 2007/0285759 A1 | 12/2007 | Ash et al. |
| 2008/0030836 A1 | 2/2008 | Tonar et al. |
| 2008/0066971 A1 | 3/2008 | Whang et al. |
| 2009/0015736 A1 | 1/2009 | Weller et al. |
| 2010/0085511 A1 | 4/2010 | Watanabe et al. |
| 2011/0255142 A1 | 10/2011 | Ash et al. |
| 2013/0278989 A1 | 10/2013 | Lam et al. |
| 2014/0036338 A1 | 2/2014 | Bareman et al. |

WINDOW SYSTEM WITH INDICIA

CROSS-REFERENCE TO RELATED APPLICATION

This application claims priority to and the benefit under 37 U.S.C. §119(e) of U.S. Provisional Patent Application No. 62/130,095, filed on Mar. 9, 2015, entitled "WINDOW SYSTEM WITH INDICIA," the entire disclosure of which is hereby incorporated herein by reference.

BACKGROUND OF THE DISCLOSURE

The present disclosure generally relates to window system, and more particularly, a window system with an indicia.

SUMMARY OF THE DISCLOSURE

According to one aspect of the present disclosure, a window system is provided that includes an electro-optic element having a first substantially transparent substrate defining first and second surfaces. The second surface has a first electrically conductive layer. A second substantially transparent substrate defines third and fourth surfaces. The third surface has a second electrically conductive layer. A primary seal is disposed between the first and second substrates. The seal and the first and second substrates define a cavity therebetween. An electro-optic medium is disposed in the cavity that is variably transmissive such that the electro-optic element is operable between substantially clear and darkened states. A polymeric dust cover is positioned away from the electro-optic element defining at least two major surfaces. At least one indicia is disposed in the dust cover. The indicia includes a plurality of damage channels having an aspect ratio greater than about 10:1.

According to another aspect of the present disclosure, a method of forming an indicia is provided that includes providing an optically transparent polymeric substrate having a first surface and a second surface, using a motion device to move a laser beam relative to the substrate, and pulsing the laser beam to form a plurality of damage channels within the substrate. At least a portion of the damage channels are arranged in a grid pattern to form an indicia.

According to yet another aspect of the present disclosure, a viewing system component is provided that includes a substrate defining first and second surfaces disposed on opposite sides thereof, and at least one indicia disposed in the substrate. The indicia has a plurality of linear channels parallel to one another. The linear channels have a diameter of less than about 10 μm and a length of greater than about 100 μm.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION

Figure 1A:
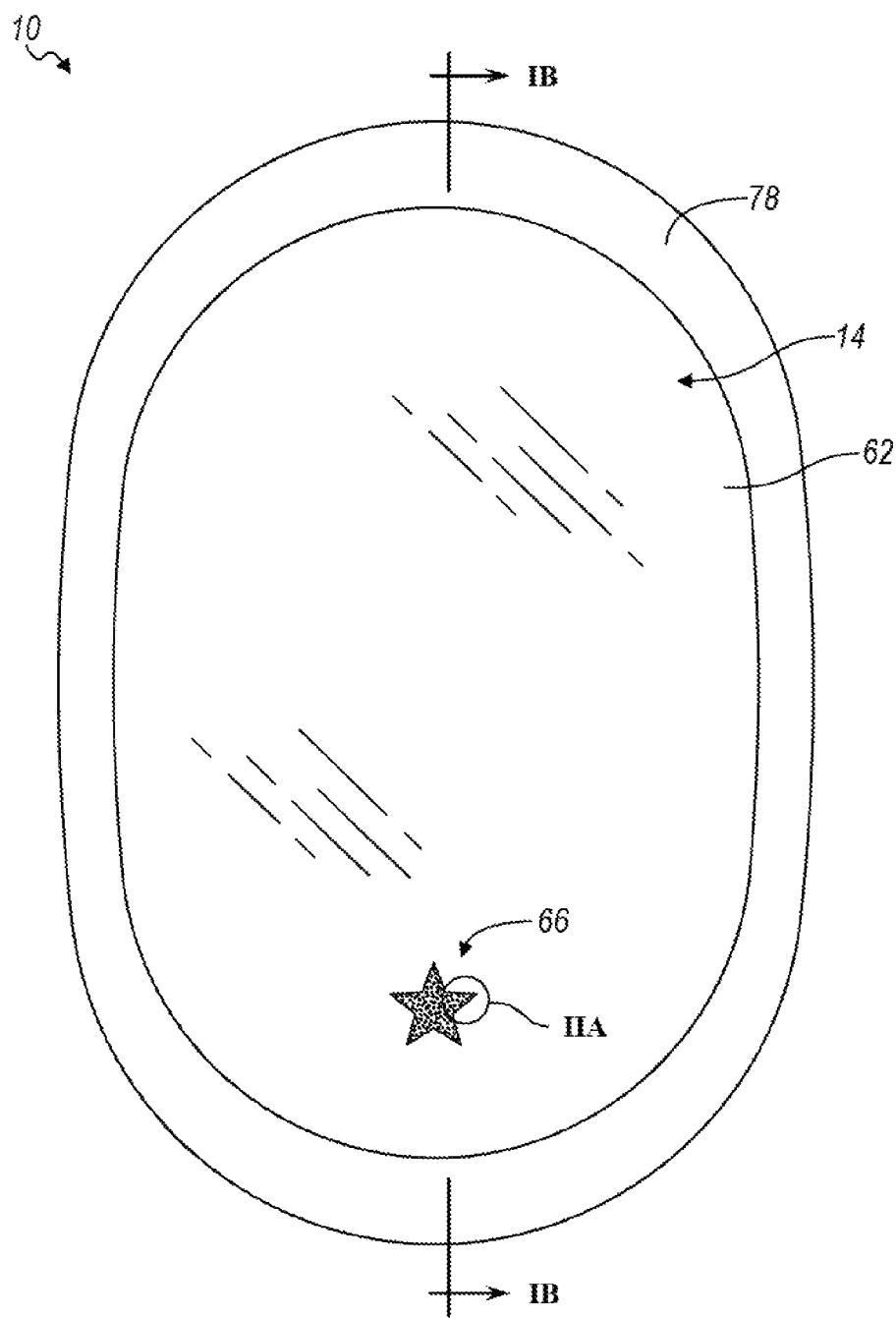
FIG. 1A is a front plan view of a window system of the present disclosure.

The present illustrated embodiments reside primarily in combinations of method steps and apparatus components related to an electro-optic element. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIGS. 1A-3, reference numeral 10 generally designates a window system including an electro-optic element 14. The electro-optic element 14 includes a first substantially transparent substrate 18 defining a first surface 22 and a second surface 26. The second surface 26 includes a first electrically conductive layer 30. A second substantially transparent substrate 34 defining a third surface 38 and a fourth surface 42. The third surface 38 includes a second electrically conductive layer 46. A primary seal 50 is disposed between the first and second substrates 18, 34. The seal 50 and the first and second substrates 18, 34 define a cavity 54 therebetween. An electro-optic medium 58 is disposed in the cavity 54. The electro-optic medium 58 may be variably transmissive such that the electro-optic element 14 is operable between substantially clear and darkened states. A dust cover 62 is positioned away from the electro-optic element 14 defining at least two major surfaces. At least one indicia 66 is disposed in the dust cover 62. The indicia 66 includes a plurality of damage channels 70 which may have an aspect ratio greater than about 10:1.

Figure 1B:
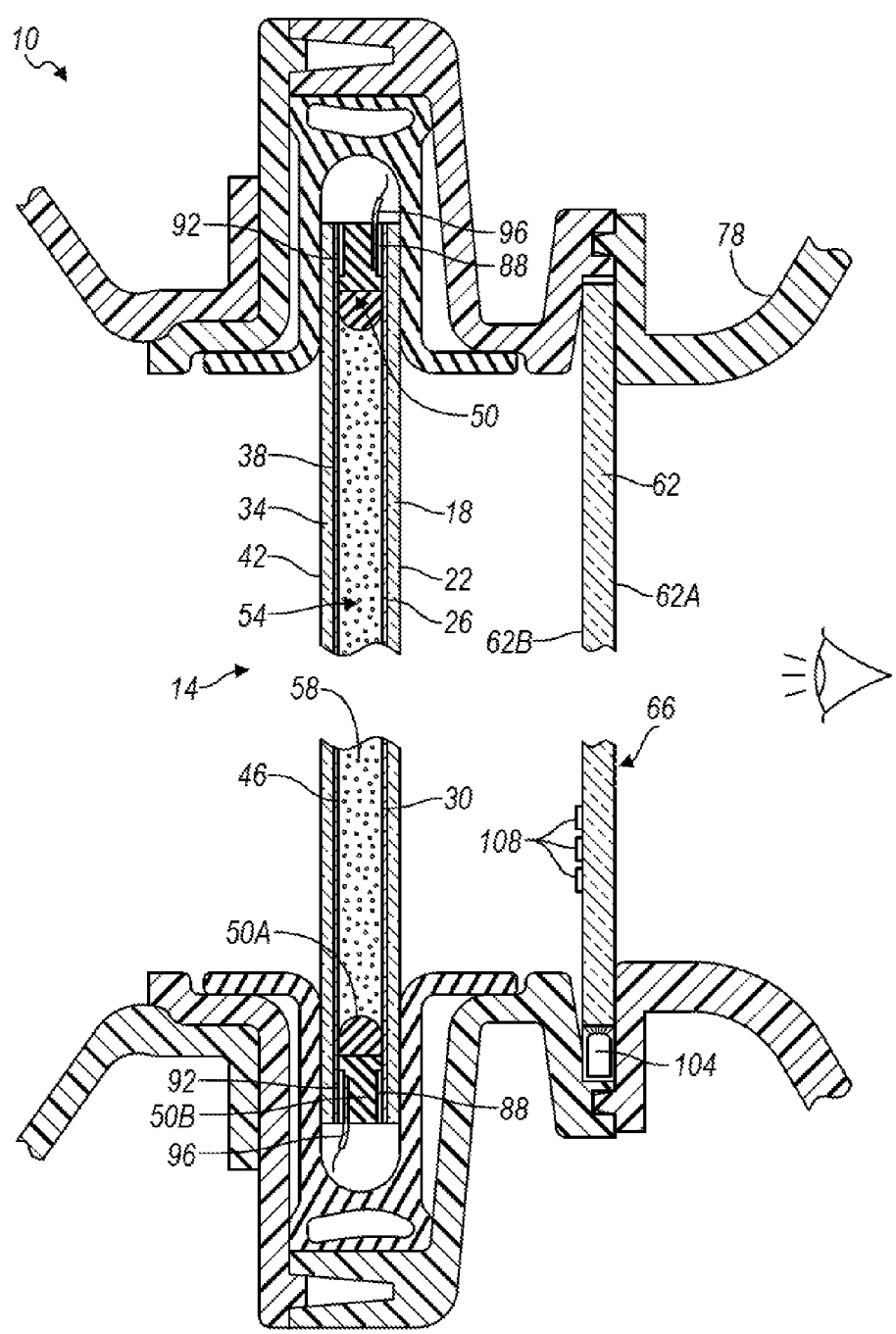
FIG. 1B is a cross-sectional view of a window system taken at IB of FIG. 1.

Referring to FIGS. 1A and 1B, the window system 10 incorporates the electro-optic element 14 and dust cover 62 behind a shroud 78. The window system 10 may be employed in vehicles (e.g., trains, planes, automobiles, buses, boats) and buildings (e.g., houses, skyscrapers, strip malls), but in the depicted example, is located within an aircraft. The window system 10 is operable between a transparent window state in which the window system 10 is substantially transparent to visible light, and a darkened state in which a portion, or no visible light, is transmitted through the window system 10 (e.g., the window system 10 becomes essentially opaque). The transparent and darkened states of the window system 10 are carried out by changing the transmission states of the electro-optic element 14 between a substantially clear state and a substantially dark or darkened state, as well as intermediate states thereto. The darkened state of the electro-optic element 14 is defined relative to the transmissivity of the substantially clear state. Typical transmissivity of the electro-optic element 14 in the substantially clear state may be greater than about 50%, greater than about 55%, or greater than about 60%. The percentage of reflectance, transmittance, and absorption of the electro-optic element 14 sum to 100%. Typical transmissivity of the electro-optic element 14 in the substantially darkened state may be less than about 1%, less than about 0.1%, less than about 0.01%, or less than about 0.001%. The shroud 78 may operate to conceal edges of the dust cover 62 and the electro-optic element 18. When the window system 10 is in the transparent window state with the electro-optic element 18 in the substantially clear state, a viewer is able to look through the window assembly 10 to observe objects behind the window assembly 10. As explained above, the dust cover 62 may include at least one indicia 66 which is visible to a viewer of the window system 10.

FIG. 1B generally depicts an enlarged cross-sectional view of the window assembly 10 of FIG. 1A, revealing greater detail. In the depicted example of FIG. 1B, the electro-optic element 14 includes the first substrate 18 having the front or first surface 22 and the second surface 26. The first surface 22 is a viewer side, as indicated by an eye symbol, and is the inward, or viewer facing side, of the window assembly 10. The first electrically conductive layer 30 is positioned on the second surface 26. The fourth surface 42 of the second substrate 34 is the outward side of the window system 10. It should be noted that the first substrate 18 may be larger than the second substrate 34 to create an offset along at least a portion of the perimeter of the window system 10. The first and second substrates 18 and 34 can be made of glass and can have a thickness of less than about 1.2 mm, less than about 0.8 mm, or less than about 0.6 mm. The second electrically conductive layer 46 is positioned on the third surface 38. In various embodiments, the second electrically conductive layer 46 may include a metal reflector or one or more coatings configured as any of the partially reflective, partially transmissive ("transflective") coatings disclosed in U.S. Pat. No. 6,700,692, the entire disclosure of which is incorporated herein by reference. Inclusion of a metal reflector or a transflective coating may render the electro-optic element 14 at least partially reflective.

Still referring to FIG. 1B, the primary seal 50 traverses an approximate perimeter of and is configured to cooperate with the first and second substrates 18, 34 to define the cavity 54 as substantially hermetic. The primary seal 50 may be applied to the first or second substrates 18, 34 by methods commonly used in the liquid crystal display (LCD) industry, such as by silk-screening or dispensing. In the depicted example, the primary seal 50 may incorporate a first and a second seal 50A, 50B. The electro-optic medium 58 is disposed within the cavity 54, as shown in FIG. 1B. First and second annular bands of highly conductive material 88, 92 are optionally deposited around the perimeter of the first and second substrates 18, 34, respectively, and electrically-conducting structures 96 (e.g., clips or wires) are secured to the highly conductive material 88, 92 and spatially separated from one another. The electrically-conducting structures 96 may supply an electrical voltage to the first and second annular bands of highly conductive material 88, 92 to create a voltage across the electro-optic medium 58, thereby reversibly driving the electro-optic element 14 between the substantially dark and substantially clear states. The first and second annular bands of highly conductive material 88, 92 may include silver, gold or aluminum (such as, for example, in a form of metallic flakes or particles dispersed in a hosting material).

According to at least one embodiment, the electro-optic medium 58 is an electrochromic medium which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" will be may mean, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical field is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration Enhanced Stability, Process For The Preparation Thereof and Use In Electrochromic Devices;" U.S. Pat. No. 6,519,072 entitled "Electrochromic Device;" and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety.

Aircraft typically use an interior dust cover (e.g., the dust cover 62) which provides a barrier between the passengers and/or cabin and an exterior pressure plug, thereby leaving a space between the dust cover 62 and an exterior pressure plug. When optical dimming of the window assembly 10 is desired, the electro-optic device 14 can be placed between the dust cover 62 and the exterior pressure plug. The dust cover 62 may be formed of a glass, glass ceramic, polymeric material, metal, or composites thereof. The polymeric material may include a plastic material such as acrylic, polycarbonate, plexiglass, Poly (methyl methacrylate), high density polyethylene, polypropylene, polystyrene, and/or combinations thereof. The dust cover 62 includes at least two major surfaces. In the depicted example, the dust cover 62 includes a first cover surface 62A and a second cover surface 62B, the first cover surface 62A oriented toward the passengers/cabin and the second cover surface 62B oriented toward the electro-optic element 18. In the depicted example, the dust cover 62 includes the indicia 66. The dust cover 62 may include the indicia 66 as depicted or may include more than one indicia 66 (e.g., greater than five, ten, or twenty separate indicia). The indicia 66 can include, for example, an icon (e.g., star, arrow, circle, trademark, etc.), text (e.g., manufacturer name, safety information, manufacturing date, etc.), or other indicia 66 as a form of decoration or to indicate the location of a button.

In the depicted example, the dust cover 62 can be edge lit using a light source 104 to highlight the indicia 66. The light source 104 is depicted at the bottom of the dust cover 62, but may be positioned anywhere around the dust cover 62. In various examples, the light source 104 may be located near the indicia 66. The light source 104 is configured to emit light into the dust cover 62 such that the light interacts with the indicia 66. In one example, the light is scattered by the indicia 66, thereby illuminating the indicia 66. It will be understood that there may be a separate light source 104 for each indicia 66 in multiple indicia 66 examples (e.g., in different colors). Further, more than one light source 104 may be used to illuminate a single indicia 66. In the depicted example, positioned on the second cover surface 62B of the dust cover 62 is a sensor 108. The sensor 108 may be a capacitive touch sensor, a resistance touch sensor, a piezo touch sensor or other type of sensor configured to detect touch or proximity of an object or person. In various examples, the indicia 66 may be configured to indicate the location or function of the sensor 108 (e.g., through an arrow, text, encircling the sensor 108, symbol, etc.). In at least one example, the sensor 108 may be used to control the transmissivity of the electro-optic element 14. It will be understood that the sensor 108 may be located on either or both of the first and second cover surfaces 62A, 62B and that more than one sensor 108 may be used (e.g., to perform different functions).

The indicia 66 can be formed using an additive process such as the application of a sticker, screen-printing, inkjet printing, or other means. The indicia 66 may also be formed by directing a pulsed laser at the dust cover 62 to form laser induced damage channels 70 (FIG. 2A) within the dust cover 62. The indicia 66 may be added to one or both of the first and second cover surfaces 62A, 62B by means of damage to the dust cover 62. Such damage can also be induced by, but not limited to, chemical etching or dissolution, media blasting, abrasive damage, or a combination thereof, and, optionally, in addition to laser induced damage. The indicia 66 can be a light scattering surface that can be seen as a white area compared to the generally transmissive surrounding of the substrate.

Figure 2A:
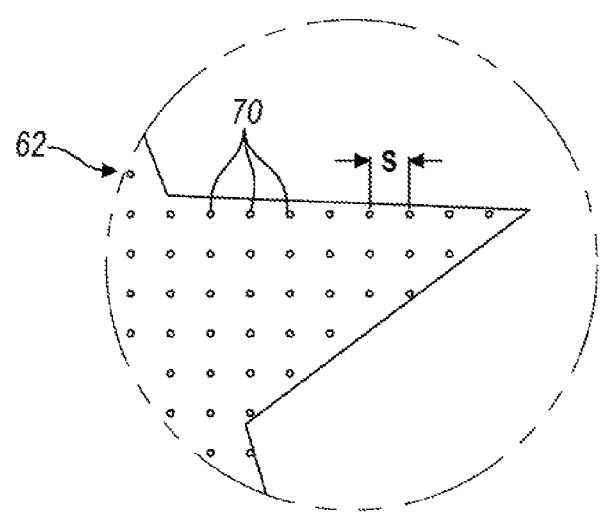
FIG. 2A is a magnified image of section IIA of FIG. 1A illustrating a plurality of damage channels of the present disclosure from a top plan view.
Figure 2B:
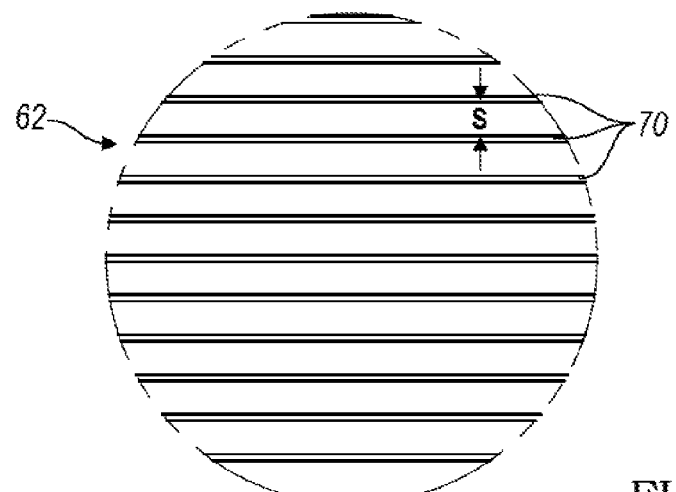
FIG. 2B is a magnified image illustrating a cross-sectional view of the plurality of damage channels of the present disclosure.

Referring now to FIGS. 2A and 2B, a pulsed laser may be directed at the dust cover 62 to form a plurality of damage channels 70. The laser induced damage channels 70 may be contrasted to surface damage by the depth of the damage and the shape of the damage. Typical surface damage may cause surface roughness and be limited to only a shallow depth (e.g., 1 to 50 um). Laser induced damage channels 70 may be differentiated from laser ablative machining because substantially no (e.g., a negligible or minute amount) material is removed from the dust cover 62 during the formation of the damage channels 70, whereas a substantial amount of material is removed during ablation. Further, the laser induced damage channels 70 may be differentiated from laser damage formed by focusing the laser to a spot either on the outside of the dust cover 62 or internal to the dust cover 62. If the laser is focused internal to the dust cover 62, a damage volume will be formed that will generally not have a high aspect ratio. Most typically the damage volume may be somewhat spherical or egg shaped. By contrast, the damage channels 70 form a line or linear section that has one dimension that is significantly greater than the cross section of the damage channel 70. In essence, the laser may heat a linear section of the material of the dust cover 62, and removal of the laser cools the material of the dust cover 62 to form the damage channels 70. The relatively quick local absorption of laser light causes local heating of the dust cover 62, which in turn causes the formation of melted material, a plurality of cracks and/or optically different material to form along, and through, the heated sections creating the damage channels 70. The damage channels 70 may be formed in a single pule (e.g., the entire length of the damage channel 70 formed at once) or through a plurality of pulses (e.g., each of the pulses being over the entire length of the damage channel 70). The pulses may be performed in "bursts," or a plurality of pulses performed in quick succession. The pulses in a burst may be separated in time by between about 1 ns and about 40 ns. The burst may have between 1 and 10 pulses of the laser. Accordingly, the total length of the burst may be between about 1 ns and about 400 ns. Bursts may be distinguished from multiple individual pulses which may be separated by more than about 0.5 μs.

The damage channels 70 produced by a laser may constitute either a series of small cracks, which together create a frosted appearance, or by organizing a plurality of the laser induced damage channels 70 into an array, such as a grid, pattern or amorphous grouping having a regular or intermittent spacing S. The laser induced damage channels 70 may also be formed in a random grouping. The spacing S between damage channels 70 may be greater in one dimension than the other, have equal spacing in both directions, or a combination thereof. The damage channels 70 may have a spacing S of between about 1 μm and about 1000 μm.

The laser induced damage channels 70 may extend from either the first cover surface 62A or the second cover surface 62B into the dust cover 62. In some examples, the damage channels 70 may fully extend between the first and second cover surfaces 62A, 62B. In other examples, the damage channels 70 may not make contact with either of the cover surfaces 62A, 62B and be completely disposed within the dust cover 62. In some examples, the damage channels 70 may have an intermittent pattern through the dust cover 62 in a straight line. For example, the damage channels 70 can form near the first and second cover surfaces 62A, 62B of the dust cover 62 with no visible damage in the center of the dust cover 62 or have multiple lengths of the damage channel 70 extending through the dust cover 62. The damage channels 70 may have a depth within the dust cover 62 of greater than about 10 μm, greater than about 100 μm, greater than about 1000 μm or extend through the entire thickness of the dust cover 62 (e.g., greater than about 3 mm). Laser induced damage channels 70 over 100 μm in depth may provide visual depth when viewing the indicia 66 formed in the dust cover 62. In addition, the damage channels 70 may be formed and extend in a direction perpendicular to the first and second cover surfaces 62A, 62B or may be formed at an angle between about 0.1° and about 25° relative to the cover surfaces 62A, 62B. The damage channels 70 may have an average diameter, or longest cross-sectional distance, of less than about 25 μm, less than about 20 μm, less than about 15 μm, less than about 10 μm, less than about 9 μm, less than about 8 μm, less than about 7 μm, less than about 6 μm, less than about 5 μm, less than about 4 μm, less than about 3 μm, less than about 2 μm or less than about 1 μm. In some examples, the diameter of the damage channels 70 may vary according to the spacing S between the channels 70. The damage channels 70 may be substantially uniform in diameter along the length of the channel 70 and have a substantially cylindrical shape or may vary in shape and diameter with depth. The aspect ratio of the damage channels 70 may be greater than 1.1:1, 1.5:1, 2:1, 10:1, 50:1, 100:1 or 1000:1. It will be understood that the aspect ratio, diameter, depth or other variables may be varied across the damage channels 70.

The percentage of cross-sectional damaged surface area within the indicia 66 may range from between about 0.01% to about 25.0%, or between about 0.1% to about 15.0%, or between about 1.0% to about 10.0%. The percentage of cross-sectional damaged surface area within the indicia 66 may vary as a function of depth into the dust cover 62, and may vary in different locations within the indicia 66 (e.g., to increase or decrease transparency). In a specific example, a cross-sectional percent of damage of the indicia 66 may be about 0.2%. Since the cross section of the damage channels 70 perpendicular to the length of the channel can be small, the total area of damage in any plane perpendicular to the length of the channels 70 may be small while still allowing significant light scattering. This can be in contrast to the use of surface damage alone (e.g., surface etching) where a larger cross sectional area must be damaged to produce the same level of light scattering. Using the damage channels 70 for the indicia 66 in the dust cover 62 has the advantage of providing a low contrast appearance when viewed along the length of the damage channels 70 and yet providing a very visible image when the dust cover 62 is edge lit, for example, or when viewed from an angle. This angle effect may create an aesthetically interesting appearance.

In examples where the damage channels 70 are greater in length than in diameter, the indicia 66 may appear significantly less visible when viewed along the damage channels 70 as compared to viewing the indicia 66 on an angle. This is because if one is looking in the direction "parallel" to the damage channels 70, the total area of the indicia 66 that is visible is much less than that when viewed on an angle. When viewed at an angle, the indicia 66 may be much more visible, because now one is seeing the sides of the damage channels 70. As such, the angle of the damage channels 70 relative to the first and second cover surfaces 62A, 62B may be tailored such that the indicia 66 is readily apparent at expected viewing angles. Further, as explained above, the indicia 66 may be highlighted by edge-lighting from the light source 104 (FIG. 1B). In such cases, the damage channels 70 may scatter light off of the edge of the large depth extent of the damage channels 70.

The indicia 66 may be produced with a non-uniform density of damage channels 70 in order to compensate for a non-uniform edge-lighting, back-lighting, or viewing angle in order to obtain a more uniform light scattering over the entire indicia 66 or to highlight certain features of the indicia 66. If the relatively high transparency of the indicia 66, when viewed normal to the to the first and second cover surfaces 62A, 62B, is undesirable, the transparency may be decreased by increasing the density of damage channels 70 and/or by increasing the diameter of the damage channels 70.

Depending on the spacing S and pattern of the damage channels 70, the indicia 66 may produce a diffraction grating pattern. The diffraction pattern may be visible when looking through the indicia 66 at a point light source, or in the reflection of a point light source, off of the indicia 66. The diffraction pattern may visibly separate component colors of the point light source by creating constructive interference of each wavelength at different angles. Diffraction patterns may also appear while viewing light transmitted through, or reflected off, the indicia 66, but not from a point source. While viewing the indicia 66, the indicia 66 may appear to change colors due to the diffraction pattern as the viewing angle is shifted. Changing of the apparent color may be, at least in part, due to the constructive interference of a specific wavelength as visible from certain angles only. In essence, only a portion of the diffraction pattern is being viewed at once, with the angle between the indicia 66 and the viewer determining which portion of the diffraction pattern (e.g., color) is visible. The diffraction effect may be controllable by the pattern of the damage channels 70 that is chosen, and not necessarily the damage percentage. A repeating pattern in one direction of damage channels 70 may make colors visible from different angles in that direction (e.g., horizontal lines with equal spacing in the vertical direction will make different colors visible from different vertical angles). A more random pattern can be used if the diffraction effect is undesirable. In principle, the color visible at each angle can be controlled by choosing an appropriate pattern.

Damage channels 70 within the indicia 66 may be in the same plane or may cooperate to form a three dimensional structure. A three dimensional structure may be formed via either vertical motion of the dust cover 62 during operation of the laser or with the use of a three dimensional movement of the laser. In examples incorporating a three dimensional structure, the indicia 66 may appear different when viewed at different angles. The depth and width of the damage channels 70 may also be varied by changes in the pulse energy to produce a three dimensional structure.

Figure 3:
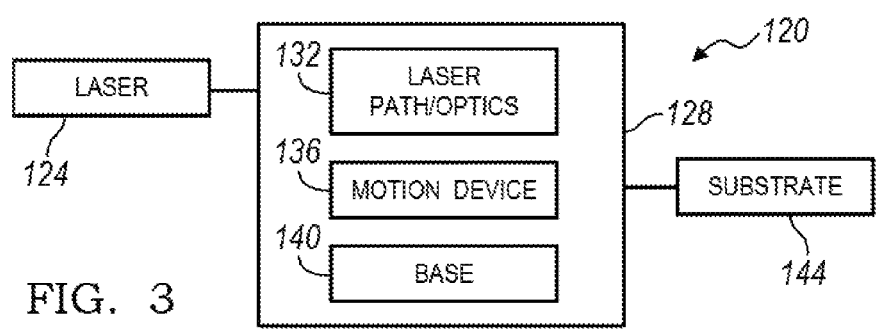
FIG. 3 is a block diagram of a laser system.

Referring now to FIG. 3, an example of a laser system 120 is illustrated diagrammatically. The laser system 120 can include a laser 124 that is in optical communication with a laser delivery assembly generally indicated at reference identifier 128. The laser delivery assembly 128 can include a laser path or optics 132, a motion device 136 (X-axis motion, Y-axis motion, and/or Z-axis motion), and a base 140, and the laser delivery assembly 128 can be configured to direct a beam emitted from the laser 124 to a substrate 144 (e.g., the dust cover 62). The base 140 is configured to support the substrate 144 during formation of the damage channels 70 (FIGS. 2A and 2B).

The laser system 120 can be configured to form one or more damage channels 70 (FIGS. 2A and 2B) in the substrate 144 at any one or more of a plurality of spaced apart locations. Examples of a laser system and products and one or more manners by which laser induced channels can be formed in a substrate are described in U.S. Patent Application Publication No. 2014/0036338, published on Feb. 6, 2014, and entitled "APPARATUS, METHOD, AND PROCESS WITH LASER INDUCED CHANNEL EDGE." The laser system 120 can be configured to deliver laser pulses to the substrate 144 at an angle of incidence between about 0° to about 25° such that the damage channels 70 may be formed at an angle as explained above. The motion device 136 is configured to alter the path of the laser 124 by translating the optics 132 in the X, Y and Z directions such that the location of impingement of the laser 124 on the substrate 144 changes. The spacing S between damage channels 70 formed in the substrate 144 can be at least partially related to a speed or velocity of the motion device 136, a laser pulse burst frequency, or a combination thereof. As used herein, the terms speed and velocity are used interchangeably and refer to the magnitude of the instantaneous velocity in the instant direction of travel. The motion device 136 may scan the optics 132, in a pattern or randomly, such that the laser 124 forms the damage channels 70 in the pattern of the indicia 66.

It will be understood that although the forgoing disclosure was explained in terms of creating the indicia 66 and damage channels 70 in the dust cover 62 of the window system 10, the indicia 66 may be formed in a substrate of the electro-optic element 14, or any other substrate of the window system 10. Further, the creation of damage channels 70 may be used to create an indicia 66 in a plurality of products, including packaging, water bottles, Tupperware, or other clear products.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A window system comprising:
    an electro-optic element comprising;
        a first substantially transparent substrate defining first and second surfaces, wherein the second surface comprises a first electrically conductive layer;
        a second substantially transparent substrate defining third and fourth surfaces, wherein the third surface comprises a second electrically conductive layer;
        a primary seal disposed between the first and second substrates, wherein the seal and the first and second substrates define a cavity therebetween; and
        an electro-optic medium disposed in the cavity, the electro-optic medium being variably transmissive such that the electro-optic element is operable between substantially clear and darkened states;
    a polymeric dust cover positioned away from the electro-optic element defining at least two major surfaces; and
    at least one indicia disposed in the dust cover, the indicia comprising a plurality of damage channels having an aspect ratio greater than about 10:1.

2. The window system of claim 1, wherein the aspect ratio of the damage channels is greater than about 50:1.

3. The window system of claim 2, wherein the damage channels are perpendicular to at least one of the major surfaces of the dust cover.

4. The window system of claim 1, further comprising:
    a capacitive touch sensor disposed on the dust cover, wherein the capacitive touch sensor is positioned proximate the indicia.

5. The window system of claim 1, further comprising:
    a light source disposed proximate and optically coupled with the dust cover, wherein the light source is configured to emit light within the dust cover toward the at least one indicia.

6. The window system of claim 5, wherein the damage channels are configured to scatter light.

7. The window system of claim 1, wherein the damage channels are angled relative to at least one of the major surfaces.

8. A method of forming an indicia, comprising:
    providing an optically transparent polymeric substrate having a first surface and a second surface;
    using a motion device to move a laser beam relative to the substrate; and pulsing the laser beam to form a plurality of damage channels within the substrate, wherein at least a portion of the damage channels are arranged in a grid pattern to form an indicia.

9. The method of claim 8, wherein the polymeric substrate is a dust cover of a window assembly.

10. The method of claim 9, wherein the polymeric substrate comprises an acrylic.

11. The method of claim 8, wherein the pulsing of the laser forms each of the damage channels in at least one pulse.

12. The method of claim 8, wherein the damage channels are not in contact with either the first or second surfaces.

13. The method of claim 8, wherein pulsing of the laser beam to form the damage channels does not substantially remove material from the substrate.

14. A viewing system component, comprising:
a substrate defining first and second surfaces disposed on opposite sides thereof; and
at least one indicia disposed in the substrate, the indicia comprising a plurality of linear channels parallel to one another, wherein the linear channels have a diameter of less than about 10 μm and a length of greater than about 100 μm.

15. The viewing system component of claim 14, wherein the linear channels are positioned to form a diffraction grating.

16. The viewing system component of claim 15, wherein the linear channels are configured to scatter light.

17. The viewing system component of claim 16, wherein the linear channels comprise a damaged form of a same material as the substrate.

18. The viewing system component of claim 17, wherein at least a portion of the linear channels are arranged in a grid configuration.

19. The viewing system component of claim 18, wherein the substrate is part of an electro-optic element.

20. The viewing system component of claim 18, wherein the substrate is a dust cover.

* * * * *